(12) United States Patent
Ota et al.

(10) Patent No.: US 12,019,330 B2
(45) Date of Patent: Jun. 25, 2024

(54) DISPLAY DEVICE

(71) Applicant: Japan Display Inc., Tokyo (JP)

(72) Inventors: Takashi Ota, Tokyo (JP); Michihide Shibata, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 18/309,837

(22) Filed: May 1, 2023

(65) Prior Publication Data

US 2023/0266620 A1 Aug. 24, 2023

Related U.S. Application Data

(63) Continuation of application No. PCT/JP2021/029596, filed on Aug. 11, 2021.

(30) Foreign Application Priority Data

Nov. 4, 2020 (JP) ................................ 2020-184172

(51) Int. Cl.
*G02F 1/13357* (2006.01)
*G02F 1/1335* (2006.01)

(52) U.S. Cl.
CPC .. *G02F 1/133603* (2013.01); *G02F 1/133607* (2021.01)

(58) Field of Classification Search
CPC ......... G02F 1/133603; G02F 1/133607; G02F 1/133611; G02F 1/1336; F21S 2/00
See application file for complete search history.

(56) References Cited

U.S. PATENT DOCUMENTS

| | | | | |
|---|---|---|---|---|
| 7,954,990 B2* | 6/2011 | Gourlay | ............. | G02B 6/12004 362/624 |
| 8,177,379 B2* | 5/2012 | Peng | ................. | G02F 1/133605 362/97.3 |
| 2009/0128741 A1* | 5/2009 | Peng | ................. | G02F 1/133605 349/67 |
| 2010/0141867 A1* | 6/2010 | Ogihara | ............ | G02F 1/133605 349/61 |
| 2012/0300135 A1* | 11/2012 | Cho | ................... | G02F 1/133615 362/612 |

(Continued)

FOREIGN PATENT DOCUMENTS

JP 2017-116683 A 6/2017

OTHER PUBLICATIONS

International Search Report dated Oct. 26, 2021, received for PCT Application PCT/JP2021/029596, filed on Aug. 11, 2021, 4 pages including English Translation.

*Primary Examiner* — Zheng Song
(74) *Attorney, Agent, or Firm* — XSENSUS LLP

(57) ABSTRACT

The purpose of the present invention is to realize a display device of high definition and high contrast by applying an accurate local dimming. The structure of the invention is as follows. A display device including: a display panel and a back light, in which the back light includes a light source and an optical sheet group, the light source includes a light source substrate and LEDs disposed on the light source substrate, the light source is divided into segments in a plan view, at least one of the LEDs is disposed in a segment, the light source substrate and the LEDs are covered by a transparent resin, and a groove like gap is formed in the transparent resin along a border between the segments.

11 Claims, 15 Drawing Sheets

(56) References Cited

U.S. PATENT DOCUMENTS

2013/0256711 A1* 10/2013 Joo .................. H01L 33/60
  438/28
2019/0094616 A1* 3/2019 Kim ................ G02B 6/0051
2019/0114974 A1* 4/2019 Chen ............... G09G 3/3406

* cited by examiner

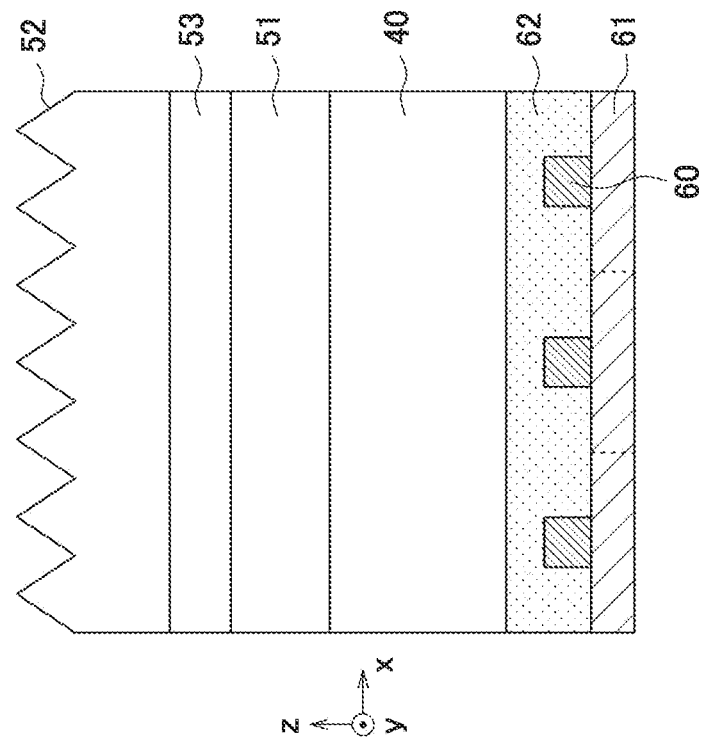
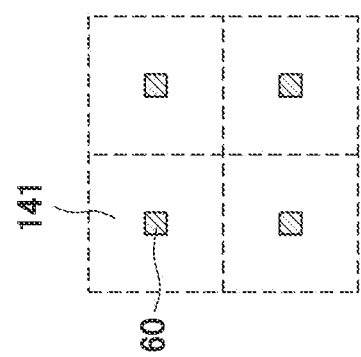

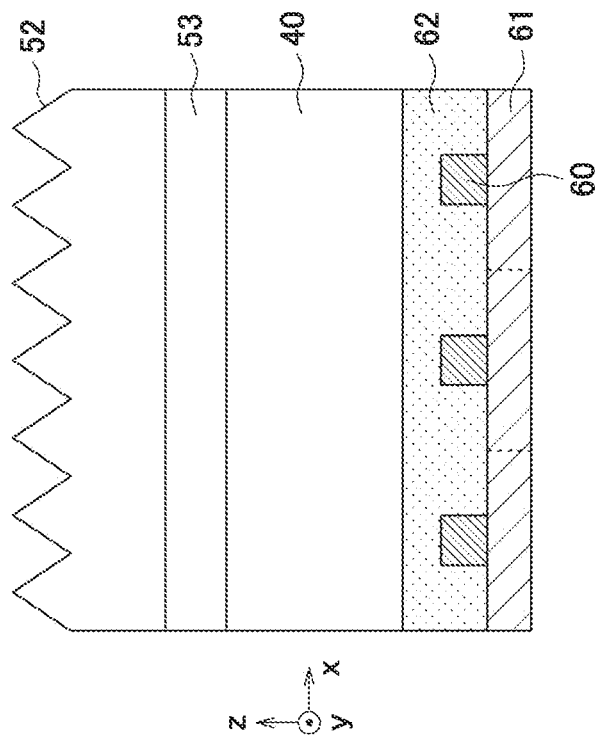
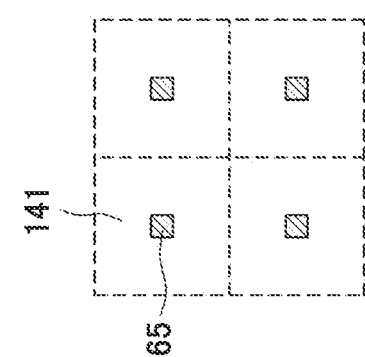

DISPLAY DEVICE

CROSS-REFERENCE TO RELATED APPLICATIONS

The present application is a continuation application of International Application No. PCT/JP2021/02959, filed on Aug. 11, 2021, which claims priority to Japanese Patent Application No. 2020-184172, filed on Nov. 4, 2020. The contents of these applications are incorporated herein by reference in their entirety.

BACKGROUND OF THE INVENTION

(1) Field of the Invention

The present invention relates to a display device having a backlight, specifically to a liquid crystal display device in which high contrast is realized by adopting local dimming technology.

(2) Description of the Related Art

A liquid crystal display device has a TFT substrate, in which pixels having pixel electrodes, TFTs (Thin film transistors) and so forth, are formed in matrix, a counter substrate opposing to the TFT substrate, and a liquid crystal layer sandwiched between the TFT substrate and the counter substrate. Images are formed by controlling the transmittance of light by liquid crystal molecules in each of the pixels.

On the other hand, in an organic EL display device, pixels are formed in matrix, and in each of the pixels, a photo emitting layer by organic EL layer, a driving TFT, a control TFT and so forth are formed; light emitting intensity from the organic EL layer is controlled in each of the pixels to form images. Since an organic EL display device is self-luminance, contrast of the image is superior.

However, a size of the pixels can be made smaller in a liquid crystal display device, thus, the definition is superior in the liquid crystal display device. Consequently, a local dimming (method) has been developed to improve contrast of the image in the liquid crystal display device. Patent document 1, for example, discloses a technology of local dimming.

PRIOR TECHNICAL DOCUMENT

Patent Document

Patent document 1: Japanese patent application laid open No. 2017-116683

SUMMARY OF THE INVENTION

Images of higher definition and higher contrast are required in displays for VR (Virtual Reality) and medical usage. When a local dinning is adopted in those displays, finer controlling in local dimming is necessary.

In such a display, some measures are taken to further raise contrast of the image by more effective local dimming such as making a size of segment, which is a unit of local dimming, smaller and controlling light in a segment not to influence neighboring segments.

According to the area of the segment becomes smaller, it becomes difficult to set a plural LEDs in one segment. On the other hand, when only one LED is set in each of the segments, there arises a problem of uniformity in luminance distribution, that is to say, the LED becomes visible from the screen side. If a diffusion sheet is set to counter measure this problem, for example, light in the segment leaks to neighboring segments through an influence of the diffusion sheet.

The purpose of the present invention is to solve the above explained problems, and to enable effective local dimming, thus, to realize a screen of a high definition and high contrast in a display device having a back light.

The present invention solves the above explained problems; the concrete measures are as follows.

(1) A display device including: a display panel and a back light, in which the back light includes a light source and an optical sheet group, the light source includes a light source substrate and LEDs disposed on the light source substrate, the light source is divided into segments in a plan view, at least one of the LEDs is disposed in a segment, the light source substrate and the LEDs are covered by a transparent resin, and a groove like gap is formed in the transparent resin along a border between the segments.

(2) The display device according to (1), in which a light guide is disposed between the optical sheet group and the transparent resin, and the transparent resin contacts the light guide.

(3) The display device according to (1), in which the groove like gap is not formed at corners of the segments.

(4) The display device according to (1), in which a depth of the groove like gap is smaller than a thickness of the transparent resin.

BRIEF DESCRIPTION OF THE DRAWINGS

FIG. 4 is a plan view of comparative example 1 in which a blue LED is used;

FIG. 5 is a cross sectional view of comparative example 1 in which a blue LED is used;

FIG. 6 is a plan view of comparative example 2 in which a white LED is used;

FIG. 7 is a cross sectional view of comparative example 2 in which a white LED is used;

DETAILED DESCRIPTION OF THE PREFERRED EMBODIMENTS

The present invention is explained by the following embodiments in detail.

Embodiment 1

Figure 1:
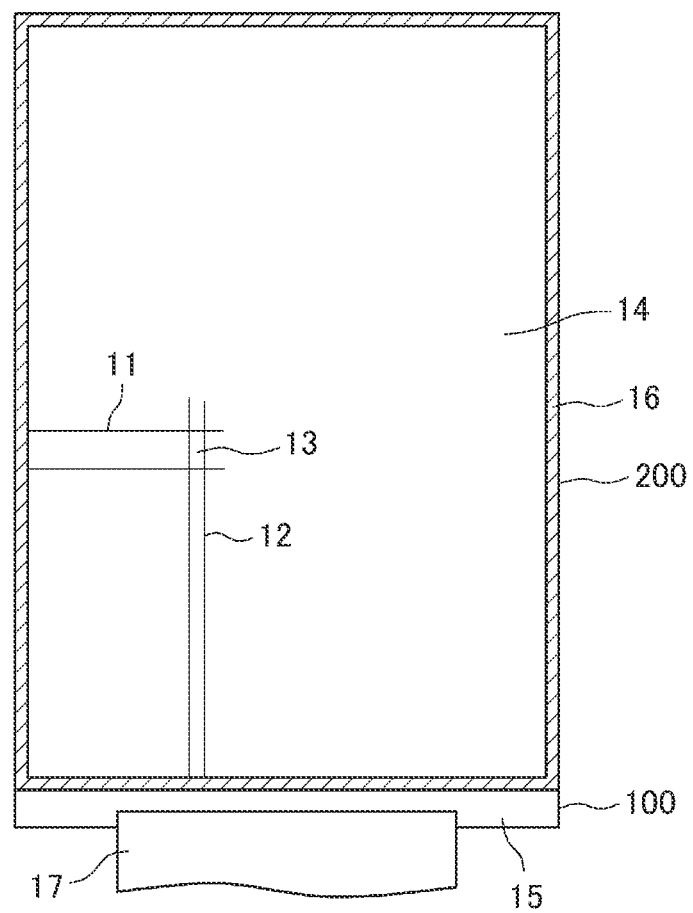
FIG. 1 is a plan view of a liquid crystal display device.

FIG. 1 is a plan view of an example of the liquid crystal display device 1. In FIG. 1, the TFT substrate 100 and the counter substrate 200 adhere to each other with the seal material 16; the liquid crystal layer is sandwiched between the TFT substrate 100 and the counter substrate 200. The display area 14 is formed in the area TFT substrate 100 and the counter substrate 200 overlap. In the display area 14 of the TFT substrate 100, the scan lines 11 extend in lateral direction (x direction) and are arranged in longitudinal direction (y direction); the video signal lines 12 extend in longitudinal direction and are arranged in lateral direction. The pixel 13 is formed in the area surrounded by the scan lines 11 and the video signal lines 12.

In FIG. 1, the terminal area 15 is formed in the area that the TFT substrate 100 does not overlap the counter substrate 200. The flexible wiring substrate 17 is connected to the terminal area 15 to supply signals and powers to the liquid crystal display panel. The driver IC which drives the liquid crystal display panel is installed on the flexible wiring substrate 17. A back light is set at rear side of the TFT substrate 100 as shown in FIG. 2.

Figure 2:
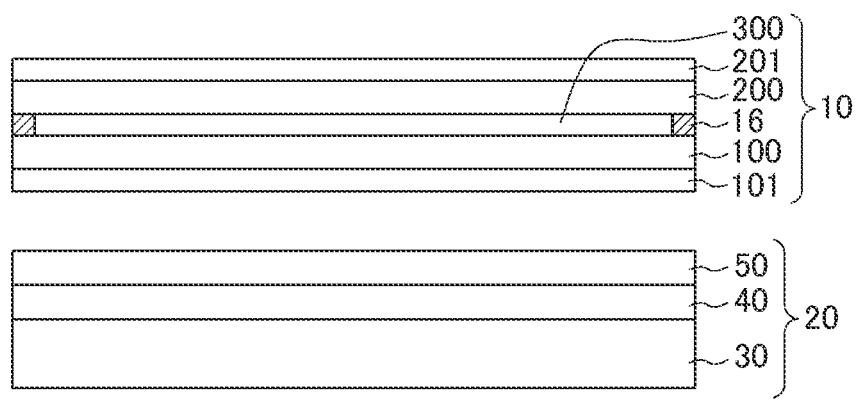
FIG. 2 is a cross sectional view of the liquid crystal display device.

FIG. 2 is a cross sectional view of the liquid crystal display device. In FIG. 2, the back light 20 is set at the rear side of the liquid crystal display panel 10. The liquid crystal display panel 10 has a structure as follows. The counter substrate 200, on which the black matrix and the color filter and so forth are formed, is set opposing to the TFT substrate 100, on which the pixel electrodes, the common electrodes, the TFTs, the scan lines, video signal lines and so forth are formed. The TFT substrate 100 and the counter substrate 200 adhere to each other at their periphery with the seal material 16, and the liquid crystal 300 is sealed thereinside.

The liquid crystal molecules get an initial alignment through the alignment films formed on the TFT substrate 100 and the counter substrate 200. When a voltage is applied between the pixel electrode and the counter electrode, the liquid crystal molecules rotate to control the transmittance of light from back light 20, thus, images are formed. Since the liquid crystal 300 can control only the polarized light, the bottom polarizing plate 101 is set under the TFT substrate 100 to pass only the polarized light for the liquid crystal 300. The modulated light through the liquid crystal 300 is analyzed by the top polarizing plate 201, thus, images are made visible.

In FIG. 2, the back light 20 is set at the rear side of the liquid crystal panel 10. The back light 20 has such a structure that the light guide 40 is set on the light source 30, and the optical sheet group 50 is set on the light guide 40. There are two types of back light 20 for the display device; that is to say, a side light type back light in which the light source as the light emitting diodes (LEDs) and the like are set on a side of the light guide, and a direct back light in which the LEDs and the like are set under the light guide. The present invention is adopted in the direct back light.

In FIG. 2, the light guide 40 is set on the light source 30. The light guide 40 is made from a transparent resin. The light guide 40 in FIG. 2 has a role to make the light entering the light guide 40 from the LED, which is a point light source, uniform by reflecting the light at the interface.

The optical sheet group 50 is set on the light guide 40. The optical sheet group 50 includes a prism sheet, a diffusion sheet and the like. In addition, when the blue color LED is used for the light source, a color conversion sheet, in which the fluorescent material is dispersed in the resin sheet, may be used to convert the blue light to the white light. The color conversion sheet may use quantum dots. Further, the polarizing reflection sheet may be used to utilize the light from the back light 20 more efficiently. What kind of optical sheet is used or how many of those optical sheets are used is determined by a kind of the display device.

When images are formed, liquid crystal display device transmits light from the back light at bright portion of the image and light is blocked at the dark portion of the image. The contrast of the image is defined by a ratio of a bright portion and a dark portion. The dark portion is formed shielding light from the back light by the liquid crystal. The light shielding by the liquid crystal, however, is not perfect, but some leak of light occurs; consequently, the contrast is degraded.

Figure 3:
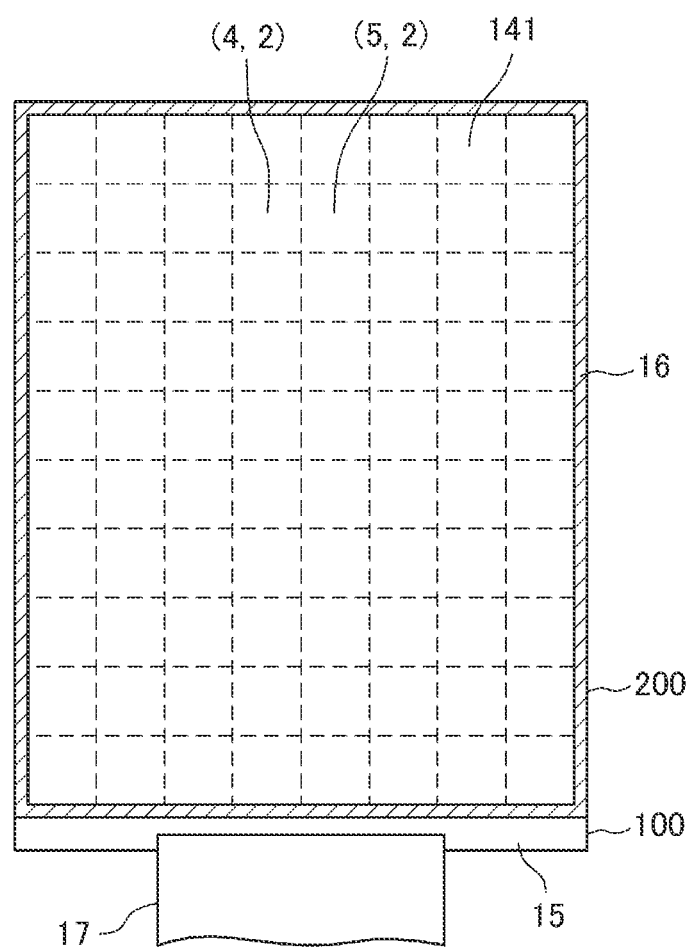
FIG. 3 is a plan view in which examples of segments are shown in local dimming method.

A local dimming enables a deep dark display by not applying light from the back light to the dark region of the images; consequently, a high contrast can be realized. FIG. 3 is an example of the liquid crystal display device having a local dimming. FIG. 3 is a plan view of the liquid crystal display device, the structure of which is the same as explained in FIG. 1. In FIG. 3, the display area 14 is divided into segments 141. The broken lines express the border of the segments 141, however, they are only for convenience sake; there are no such borders in the actual liquid crystal display panel. The light sources in the back light are set in each of the segments.

In FIG. 3, it is premised as that the segment (4, 2) is a bright portion and the segment (5, 2) is a dark portion. In the local dimming, the light source, namely, the LED is light on at the segment (4, 2), the light source, namely, the LED is light off at the segment (5, 2). Thus, the black display at the segment (5, 2) becomes a deep black, consequently, high contrast can be realized.

However, there is no actual border between the segments, thus, the light in the segment (4, 2) may influence the segment (5, 2). Therefore, light from the back light can be applied to (5, 2), which is to display black; consequently, the effect of the local dimming cannot be thoroughly performed.

FIGS. 4 and 5 depict a comparative example 1 of the back light to mitigate such problems. In FIGS. 4 and 5, blue LEDs 60 are used for light sources. FIG. 4 is a plan view in which placement of the LEDs 60 as the light source in each of the segments 141 is shown. Herein after, the light source is expressed as the LED 60. In FIG. 4, each of the segments 141 are partitioned by the broken lines. The broken lines are, however, for the sake of convenience; there is no such a border in the actual device. A dimension of each of the segments is 4 mm square or less; in FIG. 5, e.g., 2 mm square. The dimensions of the segments 141 in the examples below are the same. In FIG. 4, one LED 60 is disposed in each of the segment 141.

FIG. 5 is a cross sectional view of the back light according to the comparative example 1. In FIG. 5, the LEDs 60 are set on the light source substrate 61; the transparent resin 62 is formed covering the LEDs 60. A blue light LED is used as the LED 60. Acrylic resin or silicone resin is used as the transparent resin 62. The transparent resin 62 is for protection of the LEDS 60, electrodes, wirings and the like formed on the light source substrate 61. The broken lines in the light source substrate 61 are borders between the segments for a convenient sake.

The light guide 40 is set on the transparent resin 62. Even the light guide 40 is transparent, it reflects the light entered the light guide 40, at the interface, thus, makes light from the LEDs 60 uniform. The color conversion sheet 51 is set on the light guide 40. The phosphorous material, which converts blue light to yellow light is dispersed in the color conversion sheet 51; thus, the blue light is converted to white light through the color conversion sheet 51. A thickness of the color conversion sheet 51 is, e.g., 50 to 200 microns.

The diffusion sheet 53 is set on the color conversion sheet 51. The diffusion sheet 53 is used to diffuse light from the light source 60 to have uniform brightness. A thickness of the diffusion sheet 53 is, e.g., 50 to 200 microns. The prism sheet 52 is set on the color conversion sheet 51. The configuration of the prism sheet 52 is that the prisms, whose cross sections are triangle, extend in y direction, and are arranged x direction. The role of the prism sheet 52 is to direct the light, which exists obliquely from major surface of the color conversion sheet 51, to the direction perpendicular to the major surface of the color conversion sheet 51, thus, to raise a utilization efficiency of light. One prism sheet 52 is used in FIG. 5, however, another prism sheet, which has a prism array extending perpendicular to the prims array of prism sheet 52, may be added. A thickness of the prism sheet is as that: a thickness of the prism portion, namely, a height of the prism, is 50 microns, a thickness of the base is 70 microns, and a total thickness is 120 microns.

FIG. 6 and FIG. 7 depict a comparative example 2 in which a white LED 65 is used as a light source 60. FIG. 6 is the same as FIG. 4 except that the LED as a light source is a white LED 65. FIG. 7 is a cross sectional view of the back light in the comparative example 2. In FIG. 7, a white LED 65 is disposed on the light source substrate 61; transparent resin 62 is coated covering the white LED 65.

A light guide 40 is disposed on the transparent resin 62. The role of the light guide 40 is the same as explained in the comparative example 1. A diffusion sheet 53 is disposed on the light guide 40; a color conversion sheet 51 is not used; since a white LED 65 is used, a light conversion sheet 51 is not necessary. The role of the diffusion sheet 53 is the same as explained in FIG. 5. A prism sheet 52 is disposed on the diffusion sheet 53. A structure and function of the prism sheet 52 is the same as explained in FIG. 5.

A problem of the comparative example 1 and the comparative example 2 is that light from the LED 60 or LED 65 leaks to adjacent segments through the transparent resin 62 which covers the LED 60 or 65, the light guide 40, the light conversion sheet 51, and the diffusion sheet 53. Specifically, a leak to the adjacent segment through the transparent resin 62, which is near to the light source, is large.

Figure 8:
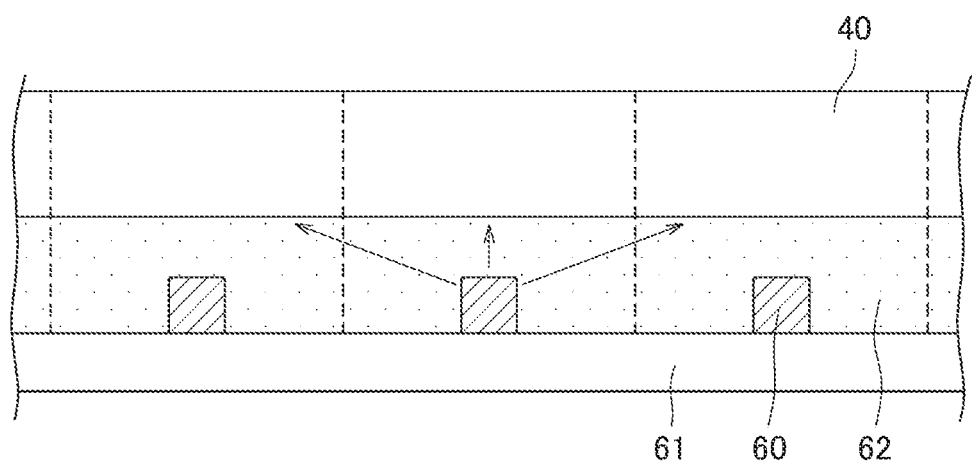
FIG. 8 is a cross sectional view, which shows a problem in comparative example 1 and comparative example 2.

FIG. 8 is a cross sectional view which shows the problem in comparative examples 1 and 2. In FIG. 8, the LED 60 is disposed on the light source substrate 61; the transparent resin 62 is coated on the LED 60. The light guide 40 is disposed on the transparent resin 62. Optical sheet group which is to be set on the light guide 40 is omitted. Broken lines in FIG. 8 show a border between the segments, however, they are only for convenient sake, there does not exist such lines in actual devices.

The arrows in FIG. 8 show propagation directions of light. The light from the LED 60 propagates in lateral direction and in oblique directions as well as the upper direction. In FIG. 8, the light emitted from the LED 60 in oblique direction enters an adjacent segment. Even when a black is to be displayed in the adjacent segment, the light irradiates the display panel, therefore, an effective local dimming is not performed.

Figure 9:
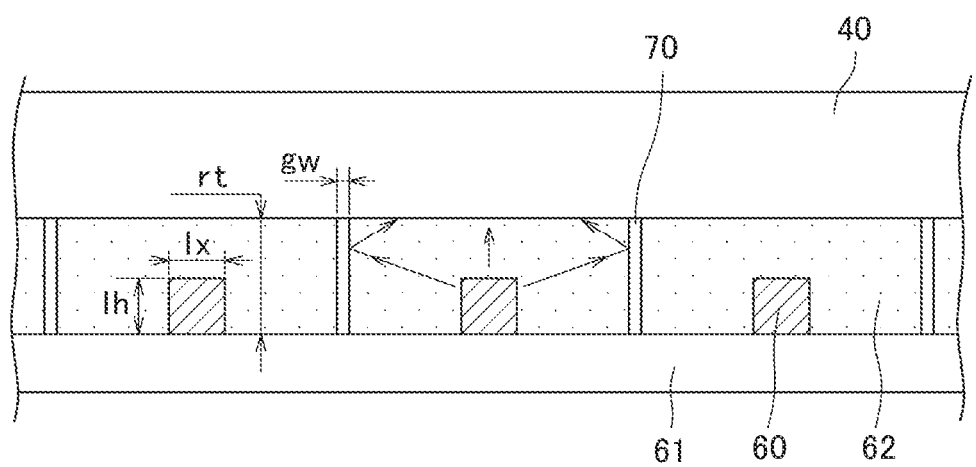
FIG. 9 is a cross sectional view which shows a function of embodiment 1.

FIG. 9 is a cross sectional view which shows the structure and the function according to present embodiment. The structure of FIG. 9 is the same as the structure of FIG. 8 except that the transparent resin 62 is divided by groove like gap 70 at the border between the segments. The arrows in FIG. 9 show propagating directions of light from the LED 60. In FIG. 9, the light, emitted from the LED 60 in an oblique direction, reflects at the groove like gap 70 of the transparent resin 62, thus, substantially decreased light enters the adjacent segment. That is to say, the light is reflected at the interface between the transparent resin 62 and the groove like gap 70 because of a difference in refraction index between the transparent resin 62 and the air. Thus, a leak of light against the function of local dimming is limited in small amount.

Therefore, a refractive index of the transparent resin 62 is lager, the better. Acrylic resin, silicone resin and so forth can be used for the transparent resin 62. In FIG. 9, a plan view of the LED 60 is square; a width lx of the LED 60 is, e.g., 0.1 mm to 0.5 mm. A thickness rt of the transparent resin 70 is, e.g., 0.5 mm to 1.0 mm. A height lh of the LED 60 is, e.g., 0.3 mm to 0.5 mm.

A width gw of the groove like gap 70 can have a large variety, however, it is preferable as narrower as possible as far as it is in a manufacturable range. That is to say, since the light form the LED 60 does not reach in the groove like gap 70, the portion of the groove like gap 70 becomes dark; as a result, an unevenness in brightness occurs when the transparent resin 62 is seen in a plan view. In general, however, an unevenness in brightness in a screen of the display panel is not recognized because the influence on the brightness unevenness due to the groove like gap 70 is mitigated by effects of the light guide 40, the diffusion sheet 53 and so forth disposed on the transparent resin 62. Nevertheless, a width gw of the groove like gap 70 is preferable to be narrower because brightness unevenness becomes harder to occur according to the width of the grove like gap gw 70 becomes narrower.

Figure 10:
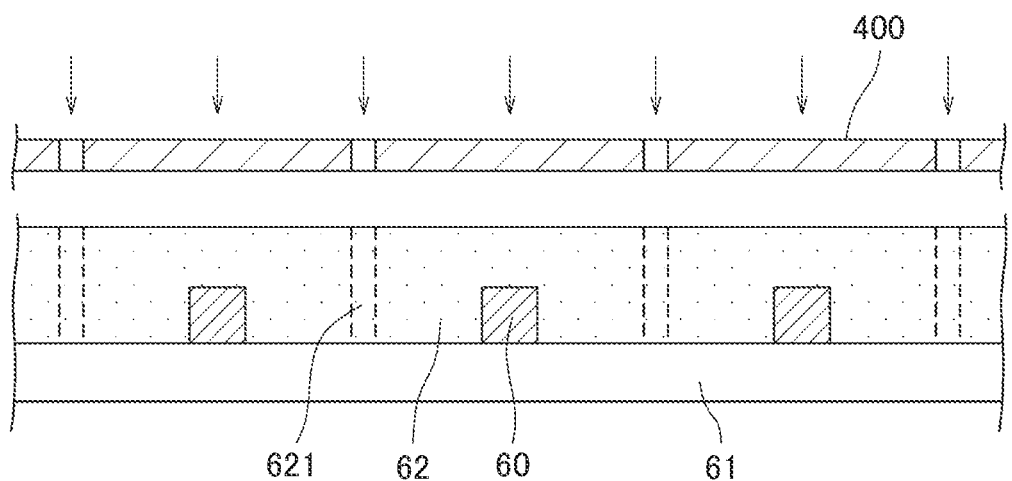
FIG. 10 is a cross sectional view which shows a process to form a groove like gap in the transparent resin in embodiment 1.

FIG. 10 is a cross sectional view of the process to realize the structure of FIG. 9. In FIG. 10, the transparent resin 62 is formed by photo lithography. In FIG. 10, a positive type light sensitive resin is used for the transparent resin 62. The light sensitive resin 62 is coated on the light source substrate 61 covering the LED 60; then the transparent resin 62 is hardened in temporary. After that, only a portion 621 corresponding to the groove like gap 70 in the transparent resin 62 is exposed with an exposing mask 400; and subsequently the transparent resin 62 is developed. After that the transparent resin 62 is fully cured.

Figure 11:
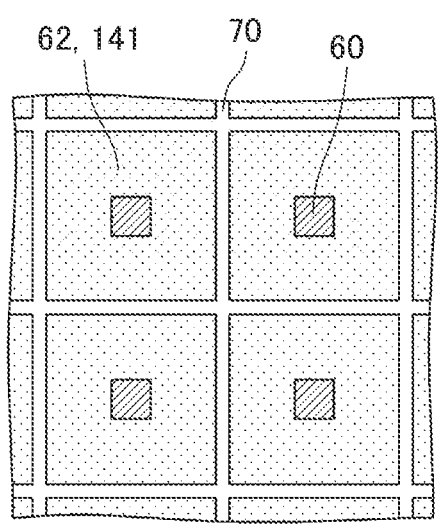
FIG. 11 is a plan view of the light source substrate according to embodiment 1.

FIG. 11 is a plan view of the light source substrate 61 formed according to the above explained process. The groove like gap 70 is formed along the border between the segments 141 in the transparent resin 62. The LED 60 is disposed at the center of the segment 141. A size of each of the segments is 4 mm square or less, for example, 2 mm square.

Figure 12:
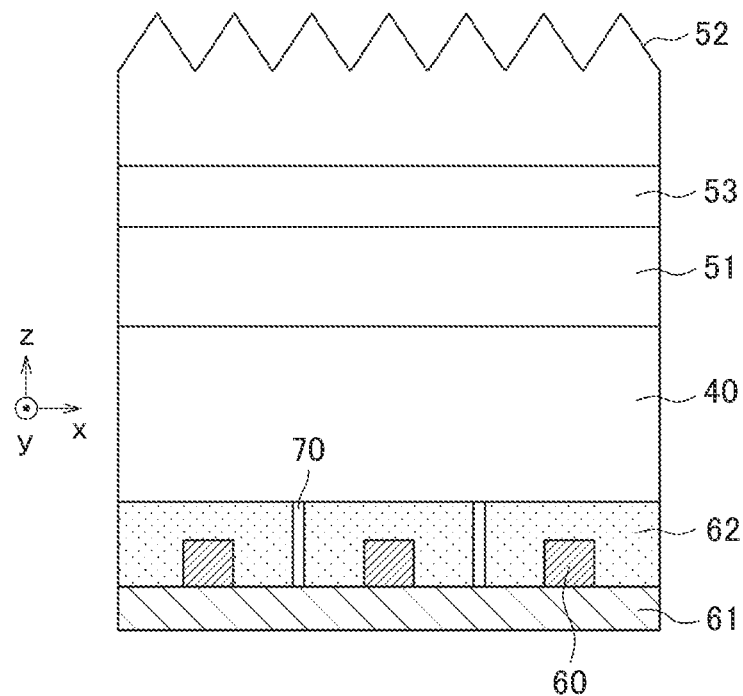
FIG. 12 is a cross sectional view of a structure of embodiment 1.

FIG. 12 is a cross sectional view of back light which adopts the light source substrate 61 of FIG. 11 according to the present invention. The structure of FIG. 12 above the light guide is the same as the FIG. 5, which is comparative example 1. In FIG. 12, a groove like gap 70 is formed at a border between the segments in the transparent resin 62. Therefore, a leak of light to the adjacent segment is decreased as explained in FIG. 9.

Figure 13:
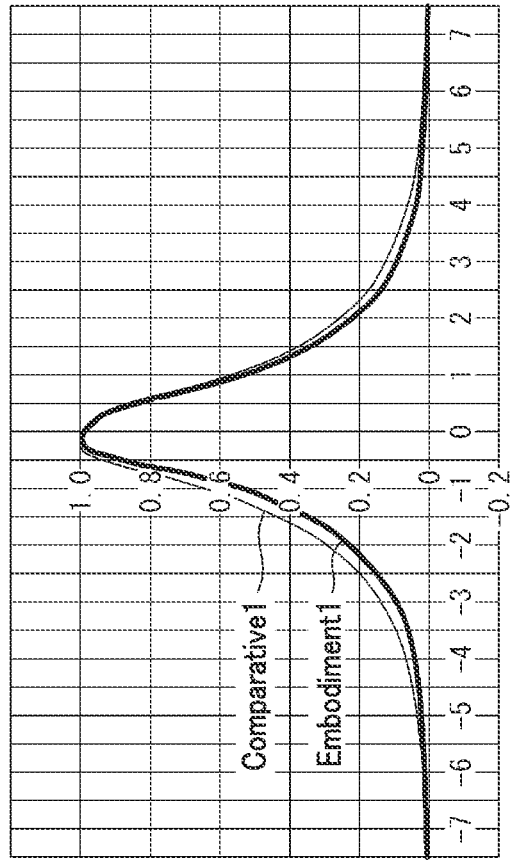
FIG. 13 is a graph which shows an effect of embodiment 1.

FIG. 13 is a graph to show a leak of light to the adjacent segment comparing between embodiment 1 and comparative example 1. The data of the graph at the top and the data of the table in the bottom are the same. In the graph of FIG. 13, the abscissa is a distance from the center of the segment at which the LED 60 is disposed, and the unit is a diameter of the segment. The ordinate is a comparative brightness, in which a brightness at a center of the LED 60 is assumed to be 1. In the meantime, the brightness is measured above the prism sheet 52 of FIG. 5 (comparative example 1) and above the prism sheet 52 of FIG. 12 (embodiment 1).

In FIG. 13, a comparison between the graph and the table is as follows. The "border" in the table in FIG. 13 means 0.5 or −0.5 at the abscissa of the graph in FIG. 13. The "border beyond one segment" in the table in FIG. 16 means 1.5 or −1.5 at the abscissa of the graph, and the "border beyond two segments" in the table in FIG. 13 means 2.5 or −2.5 at the abscissa of the graph in FIG. 13.

In the graph and the table in FIG. 13, the brightness becomes symmetrical about the ordinate theoretically; however actual data is asymmetrical due to an experimental error. The tendency of the phenomenon, however, is recognizable. In the graph of FIG. 13, when a mean value of brightness in the plus region in abscissa and the minus region in abscissa is calculated, more reasonable comparison is possible. As shown in the graph and the table in FIG. 13, a leak of light to the adjacent segment in embodiment 1 is decreased than that of comparative example 1. Therefore, more accurate local dimming can be performed in embodiment 1.

In the table of FIG. 13, "BRIGHTNESS WHEN ALL PIXELS DISPLAY WHITE" means a brightness when all the pixels in the display area display white. In this case, the value is almost the same between embodiment 1 and the comparative example 1. In the meantime, however, "BRIGHTNESS WHEN ALL PIXELS DISPLAY WHITE" in embodiment 1 is 1% larger than that in the comparative example 1; it is because light that escapes to outside from the display area in a plan view is smaller in embodiment 1 than that in the comparative example 1.

Figure 14:
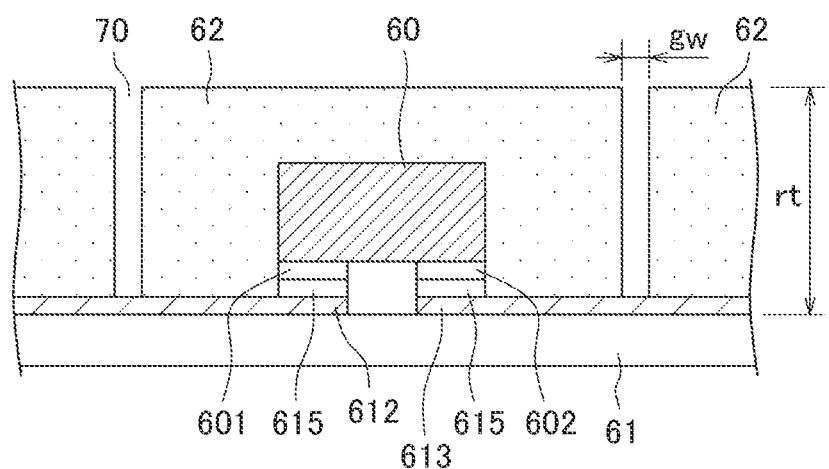
FIG. 14 is a detailed cross-sectional view of the light source substrate according to embodiment 1.

FIG. 14 is a detailed cross-sectional view which show the LED 60, the transparent resin 62, groove like gap 70, and so forth. The LED 60 is a blue LED. In FIG. 14, the light source substrate 61 is formed from, e.g., epoxy resin. The electrode pad 612, which is connected with anode 601 of the LED 60, and the electrode pad 613, which is connected with cathode 602 of the LED 60, are formed on the light source substrate 61. Other wirings are formed on the light source substrate 61; however, they are omitted in FIG. 14. The LED 60 is flip chip bonded to the electrode pad 612 and 613 formed on the light source substrate 61. The terminal electrodes 601 and 602 of the LED 60 are opposed to the electrode pads 612 and 613 of the light source substrate 61, and are connected therewith through soldering 615. The LED 60 is a structure in which a p-type semiconductor and n-type semiconductor are in p-n junction, however, other layers are added in the LED 60 to raise a light emitting efficiency.

In FIG. 14, the LED 60 is coated and protected by the transparent resin 62. The LED 60 emits light at the junction of p-type layer and n-type layer when voltage is applied to the LED 60. The light from the LED 60 is emitted not only to the upper direction but also emitted in lateral direction. The light emitted in lateral direction enters the adjacent segments, and deteriorates function of local dimming. Thus, as explained in FIG. 9, the groove like gap 70 is formed to reflect light to decrease the light leaking to adjacent segments in present embodiment.

By the way, as shown in FIG. 14, parts of the electrode 612 and 613 and so forth are not covered by the transparent resin 62, thus are disposed to the outside air. When the electrode is formed from material, which is easily corroded, there is a chance of disconnection. In addition, a thickness of the transparent resin is comparatively thick as 0.5 to 1 mm, therefore, sometimes it is difficult to make a width gw of the groove like gap 70 narrow.

On the other hand, the light is emitted at the junction of p-type semiconductor and n-type semiconductor in the LED 60. Therefore, sometimes, the light stopping effect can be performed even when the groove like gap 70 is not formed until a bottom of the LED 60. In such a case, the groove like gap 70 is not necessary to form until the surface of the light source substrate 61, but can be stopped in the middle of the transparent resin 70.

Figure 15:
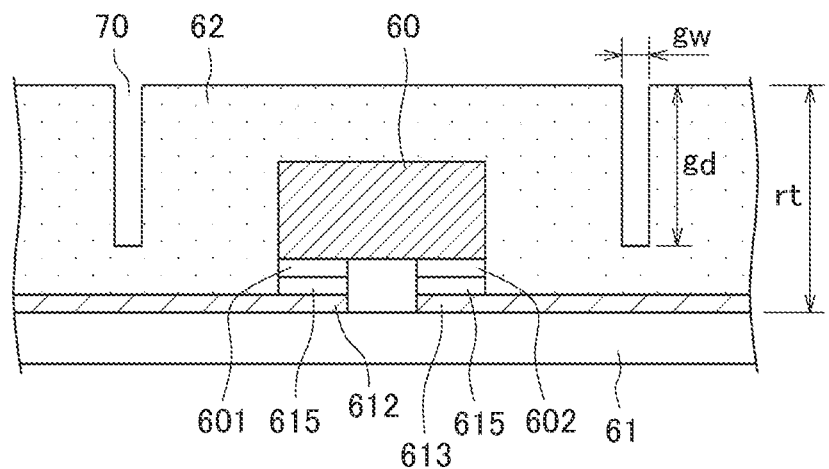
FIG. 15 is a detailed cross-sectional view of the light source substrate according to another example of embodiment 1.

FIG. 15 is a cross sectional view to show this example. In FIG. 15, a depth gd of the groove like gap 70 is larger than a half of the thickness rt of the transparent resin 62 but smaller than a thickness rt of the transparent resin 62. In other words, a depth gd of the groove like gap 70 is larger than a distance between the surface of the transparent resin 62 and the junction of the p-type semiconductor and the n-type semiconductor of the LED 60, but smaller than a thickness rt of the transparent resin 62.

Embodiment 2

AS explained in embodiment 1, a leak of light to the adjacent segments can be decreased when groove like gap 70 is formed along the border between the adjacent segments. On the other hand, since the light from the LED 60 does not enter the groove like gap 70, the portion of the groove like gap 70 becomes dark when viewed directly above the transparent resin 62. However, this brightness unevenness becomes not recognizable because of functions of the light guide 40, the diffusion sheet 63, and so forth.

Figure 16:
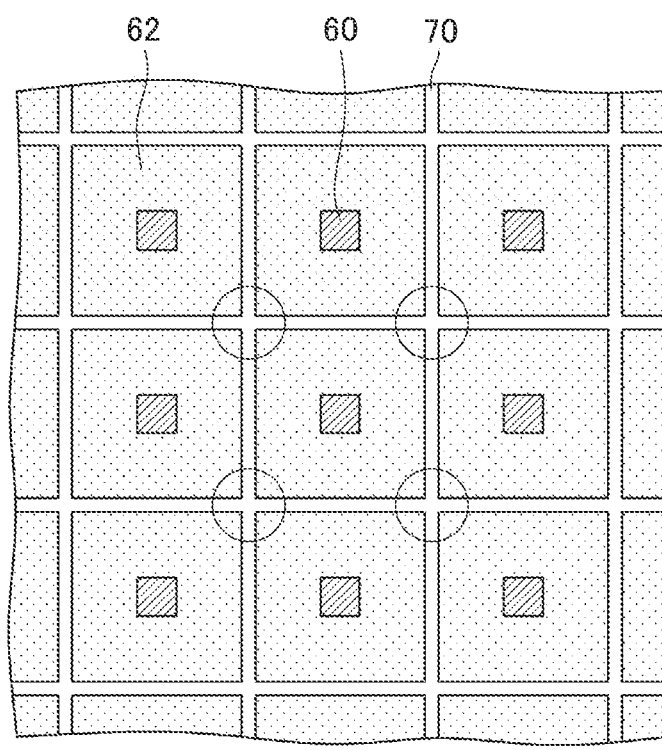
FIG. 16 is a plan view of the light source substrate to explain embodiment 2.

However, when white is displayed in all the display area, there is a chance that a brightness becomes smaller at circled portions in FIG. 16, consequently there is a chance that unevenness in brightness can occur. FIG. 16 is a plan view in which the LED 60 and the transparent resin 62 are formed on the light source substrate 61, and the groove like gap 70 is formed in the transparent resin 62. As shown in FIG. 16, influence of the groove like gap 70 on the brightness unevenness is most significant at the corners of the segments.

Figure 17:
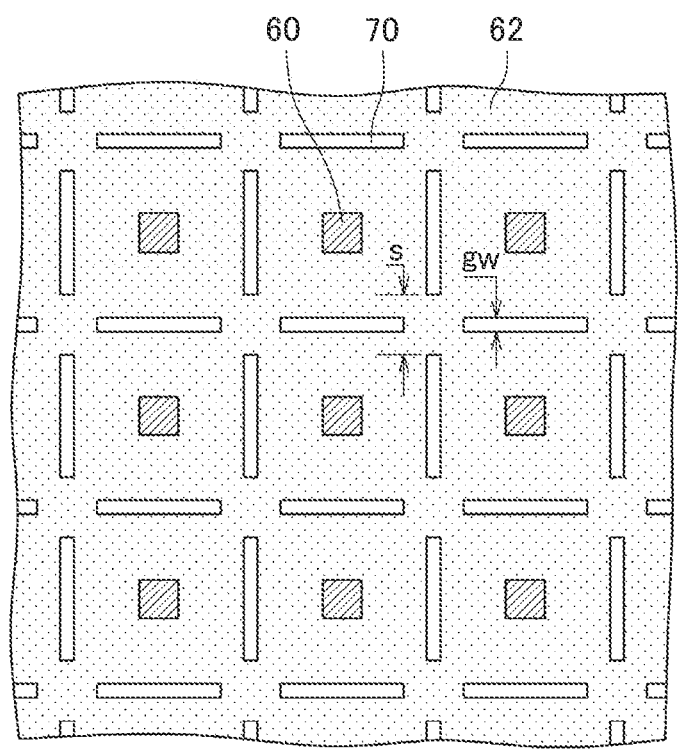
FIG. 17 is a plan view of the light source substrate to show a structure of embodiment 2.

FIG. 17 is a plan view of the structure of the grove like gap 70 formed in the transparent resin 62 to counter measure the above explained brightness unevenness. In FIG. 17, the groove like gap 70 is not formed at corners of the segments. That is to say, if the groove like gap 70 is not formed, the light from the LED 60 is not stopped, thus, brightness is not decreased. In addition, since a distance from the center of the LED 60 is largest at the corner of the segment, a leak of light to the adjacent segment is small. Therefore, an effect of the local dimming is not substantially deteriorated even the groove like gap 70 is not formed at the corner of the segments.

A range of cutting the groove like gap 70 at corner of the segment is determined in trade-off between a brightness unevenness when white is displayed in entire display area and an effect of local dimming. That is to say, the groove like gap 70 is formed in an extent that a brightness unevenness does not occur. One example according to experiment is as follows: provided a range which a groove like gap 70 is not formed at the corner of the segment is s, the s is preferable two times to six times the width gw of the groove like gap 70.

As described above, an effect of local dimming can be acquired without deteriorating brightness unevenness when white is displayed in entire display area.

Embodiment 3

Figure 18:
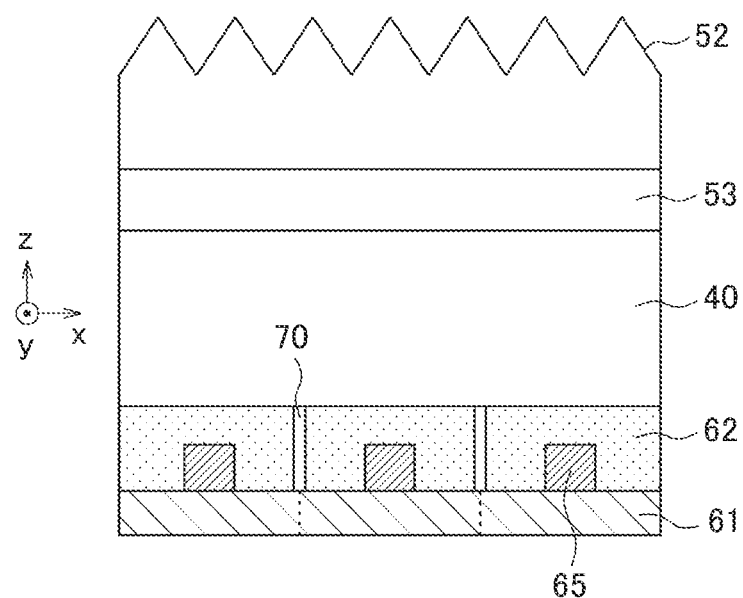
FIG. 18 is a cross sectional view of embodiment 3.

In embodiments 1 and 2, a blue LED 60 is used as the light source. The present invention is applicable when a white LED 65 is used as the light source. FIG. 18 is a cross sectional view of the backlight according to the present invention, in which white LED 65 is used. The light source portion of FIG. 18 is the same as FIG. 12 except that the blue LED 60 is substituted by the white LED 65. In FIG. 18, the color conversion sheet does not exist in the optical sheet group because the light source 65 emits already white light. Other structures of FIG. 15 are the same as the structures of FIG. 12.

A detailed cross-sectional view of the light source substrate when the white LED 65 is used is the same as FIG. 14 or 15 of embodiment 1 except that the blue LED 60 is substituted by the while LED 65. The function and effect of those structures are the same as explained in FIG. 14 and FIG. 15. In addition, the structure explained in embodiment 2 is also applicable to embodiment 3.

Embodiment 4

In embodiments 1 through 3, one LED 60, which is a light source, is used in one segment. However, the present invention is readily applicable when a plurality LEDs 60 are disposed in a segment. When a plurality of LEDs 60 exist in one segment, luminance of each of the LEDs 60 can be made smaller, thus, a bright spot, which means the LED 60 is visible as a bright spot in the display area, is hard to happen. Therefore, a diffusion sheet 63 may be eliminated from the optical sheet group.

Figure 19:
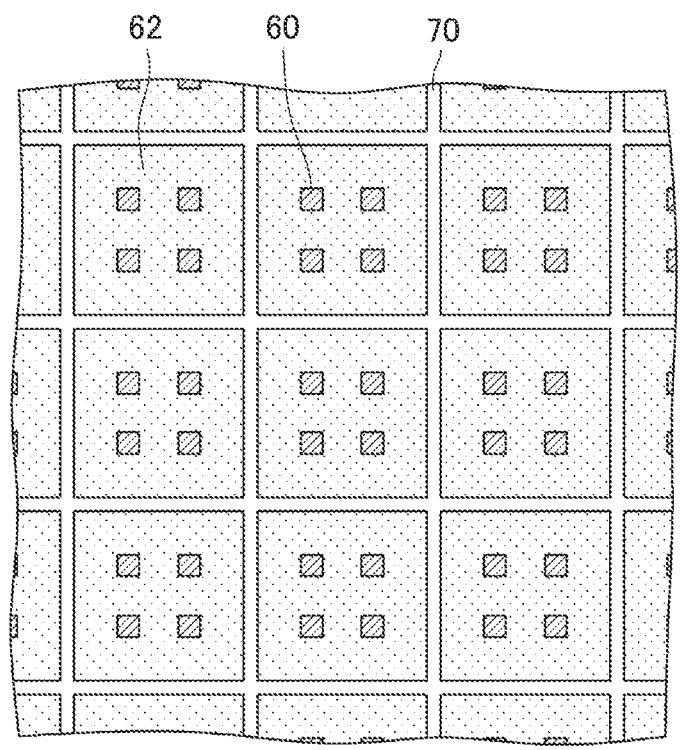
FIG. 19 is a plan view of the light source substrate to show a structure of embodiment 4.

FIG. 19 is a plan view in which four LEDs 60 are used in one segment. In FIG. 19, the groove like gap 70 is formed along the border between the segments. Other structures are the same as FIG. 11 of embodiment 1. A cross sectional view of FIG. 19 is the same as FIG. 12 of embodiment 1 except that a plurality of LEDs 60 exist in present embodiment.

Figure 20:
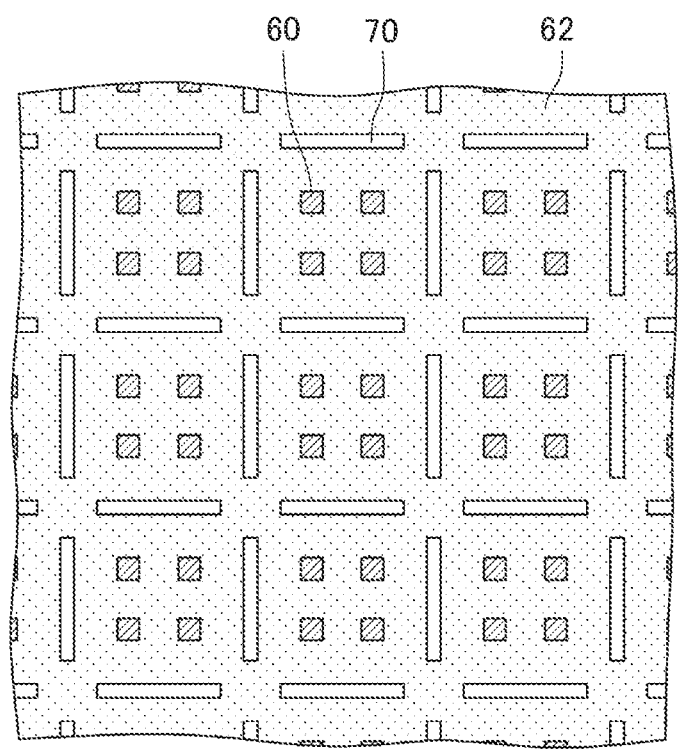
FIG. 20 is a plan view of the light source substrate to show another structure of embodiment 4.

FIG. 20 is a plan view when four LEDs 60 are formed in one segment when the structure of embodiment 2 is adopted. FIG. 20 is the same as FIG. 17 of embodiment 2 except that four LEDs exist in one segment.

As described above, the local dimming can be performed effectively by applying the present invention even a plurality of LEDs 60 are disposed in one segment. In addition, a local dimming can be performed effectively without deteriorating brightness evenness by controlling a range in forming of the groove like gap 70.

The light guide 40 is disposed on the transparent resin 62, which covers the LED 60 or LED 65 in the above explained embodiments; however, if a brightness unevenness and so forth are not a problem, the light guide 40 can be eliminated. In this case, the optical sheet group 50 is directly disposed on the transparent resin 62, which covers the LED 60 or the LED 65.

What is claimed is:

1. A display device comprising:
a display panel and a back light,
wherein the back light includes a light source and an optical sheet group,
the light source includes a light source substrate and LEDs disposed on the light source substrate,
the light source is divided into segments in a plan view,
at least one of the LEDs is disposed in a segment,
the light source substrate and the LEDs are covered by a transparent resin,
a groove like gap is formed in the transparent resin along a border between the segments,
the groove like gap has a first groove like gap and a second groove like gap,
the first groove like gap is longer in a first direction than in a second direction that intersects the first direction, the second groove like gap is longer in the second direction than in the first direction, in plan view, and
the first groove like gap is not in contact with the second groove like gap.

2. The display device according to claim 1,
wherein a light guide is disposed between the optical sheet group and the transparent resin, and
the transparent resin contacts the light guide.

3. The display device according to claim 1,
wherein the groove like gap is not formed at corners of the segments.

4. The display device according to claim 1,
wherein a depth of the groove like gap is smaller than a thickness of the transparent resin.

5. The display device according to claim 1,
wherein the groove like gap in the transparent resin is a space.

6. The display device according to claim 1,
wherein the LEDs are blue LEDs and the optical sheet group includes a color conversion sheet.

7. The display device according to claim 1,
wherein the transparent resin is formed from light sensitive resin.

8. The display device according to claim 1,
wherein each of the segments includes only one LED, and the optical sheet group includes a diffusion sheet.

9. The display device according to claim 1,
wherein the optical sheet group includes a prism sheet, a color conversion sheet, and a diffusion sheet.

10. The display device according to claim 1,
wherein the back light is capable of a local dimming operation.

11. The display device according to claim 1,
wherein the display panel is a liquid crystal display panel.

* * * * *